US011386070B2

(12) United States Patent
Natanzon

(10) Patent No.: US 11,386,070 B2
(45) Date of Patent: *Jul. 12, 2022

(54) METHOD AND SYSTEM FOR SECURE DATA REPLICATION DATA INTEGRITY VERIFICATION

(71) Applicant: EMC IP Holding Company LLC, Hopkinton, MA (US)

(72) Inventor: Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/825,322

(22) Filed: Mar. 20, 2020

(65) Prior Publication Data

US 2020/0218711 A1 Jul. 9, 2020

Related U.S. Application Data

(63) Continuation of application No. 14/502,289, filed on Sep. 30, 2014, now Pat. No. 10,628,406.

(51) Int. Cl.
G06F 16/00 (2019.01)
*G06F 16/23* (2019.01)
*G06F 16/27* (2019.01)

(52) U.S. Cl.
CPC ........ *G06F 16/2365* (2019.01); *G06F 16/275* (2019.01)

(58) Field of Classification Search
CPC ............................ G06F 16/275; G06F 16/2365
See application file for complete search history.

(56) References Cited

U.S. PATENT DOCUMENTS

| 7,346,805 | B1 | 3/2008 | Scharland et al. |
| 7,516,287 | B2 | 4/2009 | Ahal et al. |
| 7,533,289 | B1 | 5/2009 | Castillo et al. |
| 7,840,536 | B1 | 11/2010 | Ahal et al. |
| 8,301,686 | B1 | 10/2012 | Appajodu et al. |
| 8,332,687 | B1 | 12/2012 | Natanzon et al. |
| 8,341,115 | B1 | 12/2012 | Natanzon et al. |
| 8,416,954 | B1 | 4/2013 | Raizen |
| 8,521,694 | B1 * | 8/2013 | Natanzon ................ G06F 16/40 707/649 |
| 8,725,691 | B1 | 5/2014 | Natanzon |
| 9,225,529 | B1 | 12/2015 | Natanzon et al. |
| 9,405,815 | B1 * | 8/2016 | Wei ...................... G06F 16/1844 |
| 9,411,835 | B1 * | 8/2016 | Corcoran ............ G06F 11/2094 |

(Continued)

OTHER PUBLICATIONS

Du, Yuyang, and Hongliang Yu. "Paratus: Instantaneous failover via virtual machine replication." 2009 Eighth International Conference on Grid and Cooperative Computing. IEEE, 2009.*

(Continued)

*Primary Examiner* — Nan Hutton
(74) *Attorney, Agent, or Firm* — Workman Nydegger

(57) ABSTRACT

Example embodiments of the present invention relate to a method, a system, and a computer program product for verifying the integrity of replicated virtual machine data. The method includes reading data from a production volume at a production site. A representation of the data may be stored at a replica site with the integrity of the data stored in the replica volume being verified according to the representation of the data.

10 Claims, 7 Drawing Sheets

(56) References Cited

U.S. PATENT DOCUMENTS

| | | |
|---|---|---|
| 2003/0084073 A1* | 5/2003 | Hotti .................... G06F 16/275 |
| 2008/0082770 A1 | 4/2008 | Ahal et al. |
| 2011/0202916 A1 | 8/2011 | VoBa et al. |
| 2013/0091543 A1 | 4/2013 | Wade et al. |
| 2013/0191631 A1 | 7/2013 | Ylonen et al. |
| 2014/0059356 A1 | 2/2014 | Nesnow |
| 2014/0208097 A1 | 7/2014 | Brandwine et al. |
| 2015/0370825 A1 | 12/2015 | Outcalt |

OTHER PUBLICATIONS

Scales, Daniel J., Mike Nelson, and Ganesh Venkitachalam. "The design of a practical system for fault-tolerant virtual machines." ACM SIGOPS Operating Systems Review 44.4 (2010): 30-39.*
Davis, David. "Top 10 Best Practices of Backup and Replication for VMware and Hyper-V." Retrieved from informationweek: http://www.informationweek.com/whitepaper/Hardware/Virtualization-Hardware/top-10-best-practices-of-backup-and-replication-fo-wp1321629893 (2011).
Wang, Yongzhi, Jinpeng Wei, and Mudhakar Srivatsa. "Result integrity check for mapreduce computation on hybrid clouds," IEEE Sixth International Conference on Cloud Computing. IEEE, 2013.
U.S. Appl. No. 14/102,043, Jan. 29, 2018, Office Action.
U.S. Appl. No. 14/102,043, Jul. 27, 2015, Notice of Allowance.
U.S. Appl. No. 15/502,289, Feb. 27, 2017, Office Action.
U.S. Appl. No. 15/502,289, Jun. 20, 2017, Final Office Action.
U.S. Appl. No. 15/502,289, Jul. 25, 2018, Office Action.
U.S. Appl. No. 15/502,289, Mar. 29, 2019, Final Office Action.
U.S. Appl. No. 15/502,289, Dec. 17, 2019, Notice of Allowance.

\* cited by examiner

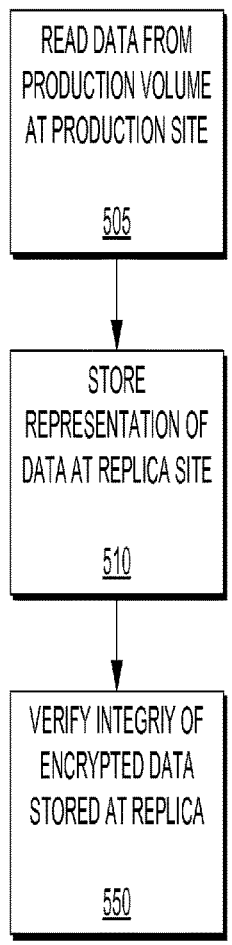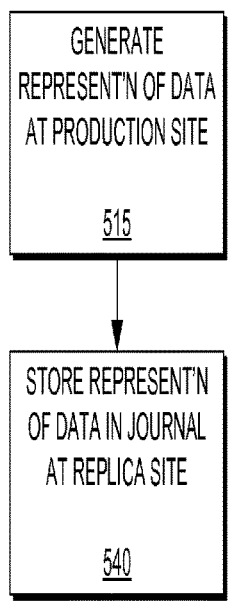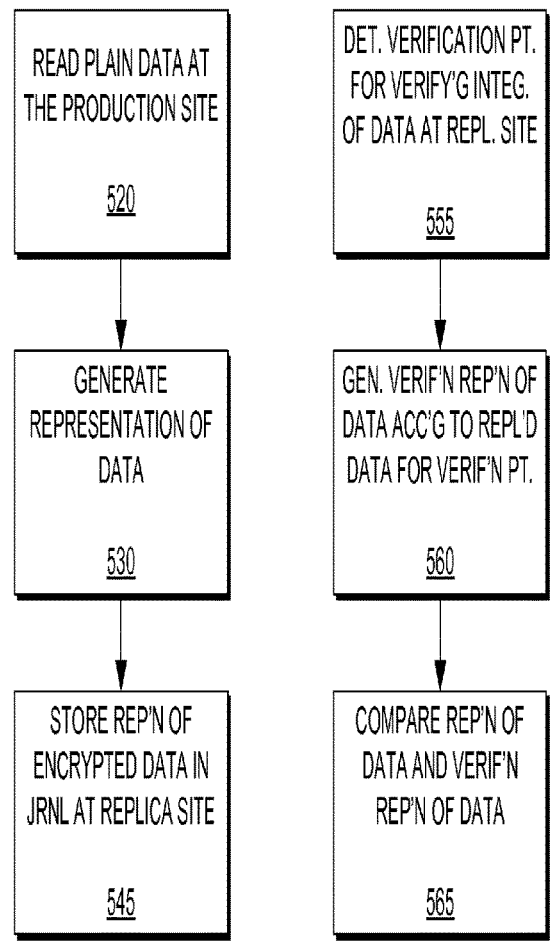
FIG. 5A  FIG. 5B  FIG. 5C  FIG. 5D

METHOD AND SYSTEM FOR SECURE DATA REPLICATION DATA INTEGRITY VERIFICATION

CROSS REFERENCE TO RELATED APPLICATION

This application is related to U.S. patent application Ser. No. 14/102,043 entitled "ENCRYPTED VIRTUAL MACHINES IN A CLOUD" filed on Dec. 10, 2013 the teachings of which are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to virtual machine replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

Example embodiments of the present invention relate to a method, a system, and a computer program product for verifying the integrity of replicated virtual machine data. The method includes reading data from a production volume at a production site. A representation of the data may be stored at a replica site with the integrity of the data stored in the replica volume being verified according to the representation of the data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIGS. 5A-5D are flow diagrams illustrating methods for storing and verifying integrity of data according to respective example embodiments of the present invention;

DETAILED DESCRIPTION

Figure 1:
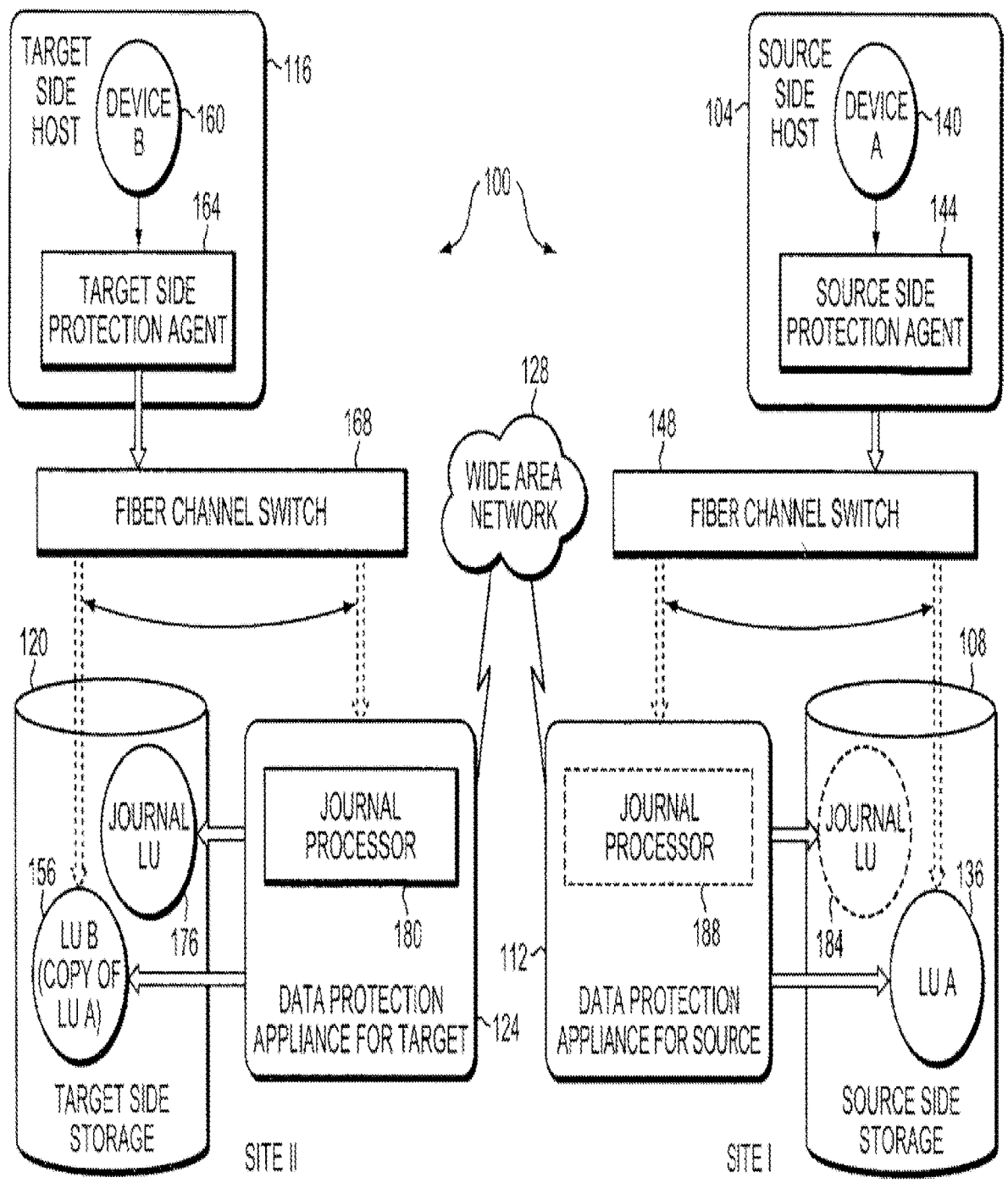
FIG. 1 is a block diagram of a data protection system according to an example embodiment of the present invention.

The following definitions are employed throughout the specification and claims.

BACKUP SITE—a facility where replicated production site data is stored; the backup site may be located in a remote site or at the same location as the production site;

BLOCK VIRTUALIZATION—may be a layer which take back end storage volumes and, by slicing, concatenating and striping, creates a new set of volumes that serve as base volumes or devices in the virtualization layer;

CLONE—a clone may be a copy or clone of the image or images, drive or drives of a first location at a second location;

CONTINUOUS DATA PROTECTION (CDP)—may refer to a full replica of a volume or a set of volumes along with a journal which allows any point in time access, the CDP copy is at the same site, and may be in the same storage array as the production volume;

CONTINUOUS REMOTE REPLICATION (CRR)—may refer to a full replica of a volume or a set of volumes along with a journal which allows any point in time access at a site remote to the production volume and on a separate storage array;

DATA PROTECTION APPLIANCE (DPA)—a computer or a cluster of computers (i.e., a physical device), or a set of processes (i.e., a virtual device or a combination of virtual and physical devices), that serve as a data protection appliance, responsible for data protection services including inter alia data replication of a storage system, and journaling of I/O requests issued by a host computer to the storage system;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

DISTRIBUTED MIRROR—may be a mirror of a volume across a distance, either metro- or geo-, which is accessible at all sites;

FAIL ALL MODE—may be a mode of a volume in the splitter where all write and read I/Os intercepted by the splitter are failed to the host, but other SCSI command, like read capacity, are served;

GLOBAL FAIL ALL MODE—may be a mode of a volume in the virtual layer where all write and read I/Os to the virtual layer are failed to the host, but other SCSI commands, like read capacity, are served;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGGED ACCESS—may be an access method provided by the appliance and the splitter in which the appliance rolls the volumes of the consistency group to the point in time the user requested and let the host access the volumes in a copy on first write base;

LOGICAL UNIT—a logical entity provided by a storage system for accessing data from the storage system;

LUN—a logical unit number for identifying a logical unit or one or more virtual disks or virtual LUNs which may correspond to one or more virtual machines;

MANAGEMENT AND DEPLOYMENT TOOLS—provide the means to deploy, control, and manage DPAs through virtual environment management tools;

MARKING ON SPLITTER—may be a mode in a splitter where intercepted I/Os are not split to an appliance and the storage, but rather changes (meta data) are tracked in a list and/or a bitmap and I/Os are sent immediately down the I/O stack;

PHYSICAL STORAGE UNIT—a physical entity, such as a disk or an array of disks, for storing data in storage locations that can be accessed by address;

PRODUCTION SITE—a facility (i.e., physical or virtual) where one or more host computers run data processing applications that write data to a storage system and read data from the storage system;

REPLICATION PROTECTION APPLIANCE (RPA)—another name for DPA;

SAN—a storage area network of nodes that send and receive I/O and other requests, each node in the network being an initiator or a target, or both an initiator and a target;

SOURCE SIDE—a transmitter (i.e., physical or virtual) of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period;

SPLITTER/PROTECTION AGENT—may be an agent running (i.e., in both physical and virtual systems) either on a production host, a switch, or a storage array which can intercept IO and split them to a DPA and to the storage array, fail IO, redirect IO, or do any other manipulation to the IO; the splitter may be in the IO stack of a system and may be located in the hypervisor for virtual machines;

STORAGE MEDIUM—may refer to one or more storage mediums such as a hard drive, a combination of hard drives, flash storage, combinations of flash storage, combinations of hard drives, flash, and other storage devices, and other types and combinations of computer readable storage mediums including those yet to be conceived; a storage medium may also refer both physical and logical storage mediums and may include multiple level of virtual to physical mappings and may be or include an image or disk image;

STORAGE SYSTEM—a SAN entity that provides multiple logical units for access by multiple SAN initiators;

TARGET—a node in a SAN that replies to I/O requests;

TARGET SIDE—a receiver (i.e., physical or virtual) of data within a data replication workflow; during normal operation a back site is the target side, and during data recovery a production site is the target side;

VASA—vSphere storage Application programming interfaces (APIs) for storage Awareness;

VIRTUAL ACCESS—may be an access method provided by the appliance and the splitter in which the appliance exposes a virtual volume from a specific point in time to the host, the data for the virtual volume is partially stored on the remote copy and partially stored on the journal;

VIRTUAL VOLUME—may be a volume which is exposed to a host by a virtualization layer and may span across more than one site;

VMDK—a virtual machine disk file containing disk data in a VMFS (analog to a LUN in a block storage array);

VMFS—a virtual machine file system provide by VMware, Inc. for storing a virtual machine; and WAN—a wide area network that connects local networks and enables them to communicate with one another, such as the Internet.

Description of Embodiments Using a Five State Journaling Process

FIG. 1 is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit;
Redirect the SCSI command to another logical unit;
Split the SCSI command by sending it first to the respective DPA. After the DPA returns an acknowledgement, send the SCSI command to its intended logical unit;
Fail a SCSI command by returning an error return code; and
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
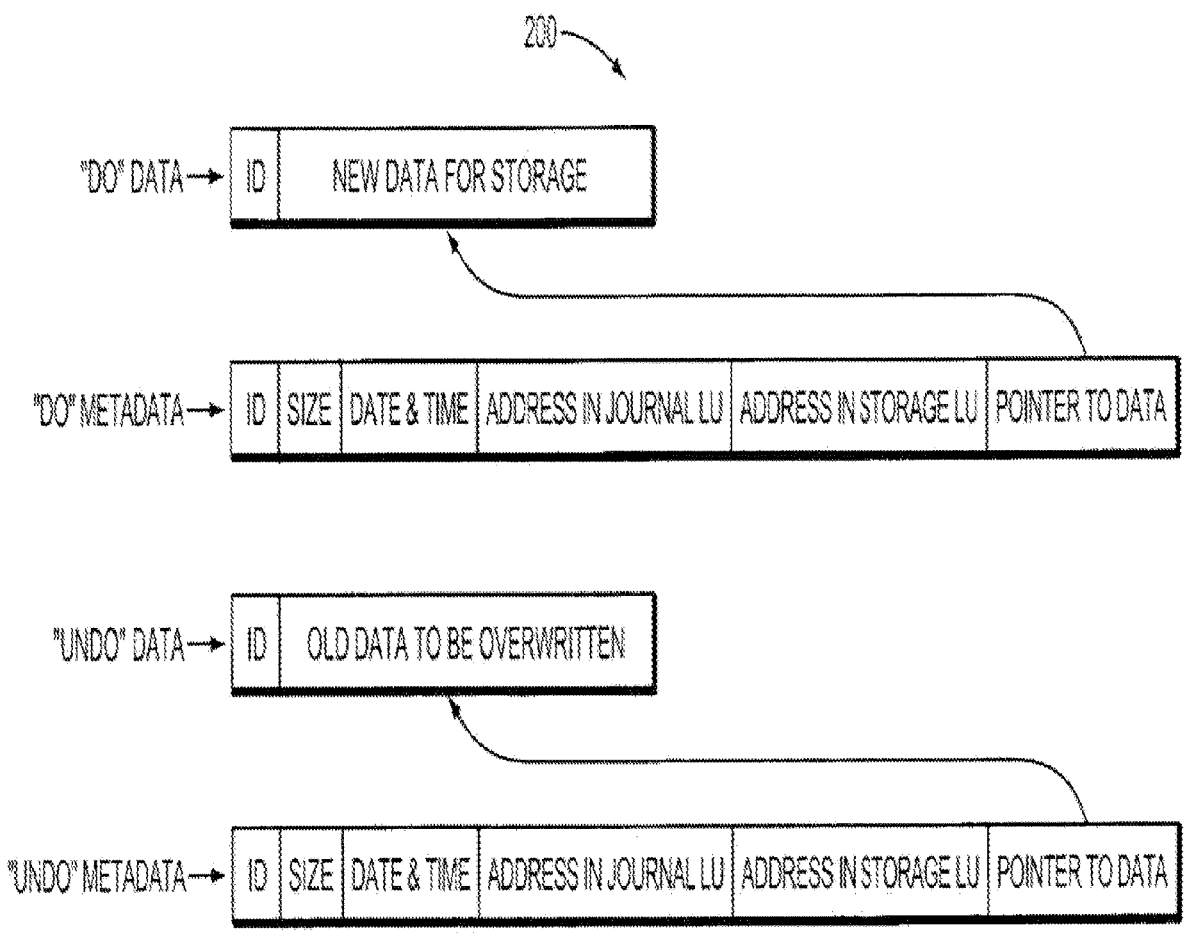
FIG. 2 is a block diagram of a write transaction for a journal according to an example embodiment of the present invention.

FIG. 2 is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter mirrors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC® PowerPath™), through an intelligent fabric switch, through array-based splitter, such as EMC CLARiiON®.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, Mass. and are hereby incorporated by reference in their entirety.

Secure Data Replication Data Integrity Verification

Encryption of virtual machines for secure replication is described in copending U.S. patent application Ser. No. 14/102,043 entitled "ENCRYPTED VIRTUAL MACHINES IN A CLOUD" filed on Dec. 10, 2013 the teachings of which are hereby incorporated herein by reference in their entirety.

Conventional solutions for recovering encrypted virtual machines at a backup site involve storing keys at the backup site. Typically, these solutions require that the keys exist at the backup site at all times, since the encryption solution is not usually integrated with the replication solution. Usually a solution will include encrypting the replication data with a first key, sending the encrypted data to the replica site, decrypting the encrypted data at the replica site, and then writing the data at the replica site to a protected storage which encrypts the data again using a second key. Generally, this introduces a vulnerability since the second key to the storage has to be present at the replica site throughout the replication process, and not only at recovery times.

Replication to the public cloud has many security challenges, mainly around security of the data. For example, traditional methods do not allow data verification with continuous replication. Although some traditional methods may allow adding checks with the data, these traditional methods require additional storage space in the volume for storing these checks and cause performance and alignment issues. Example embodiments of the present invention overcome these and other deficiencies by providing a method and a system for verifying the integrity of replicated virtual machine data to verify that cloud data was not tampered with.

Figure 3:
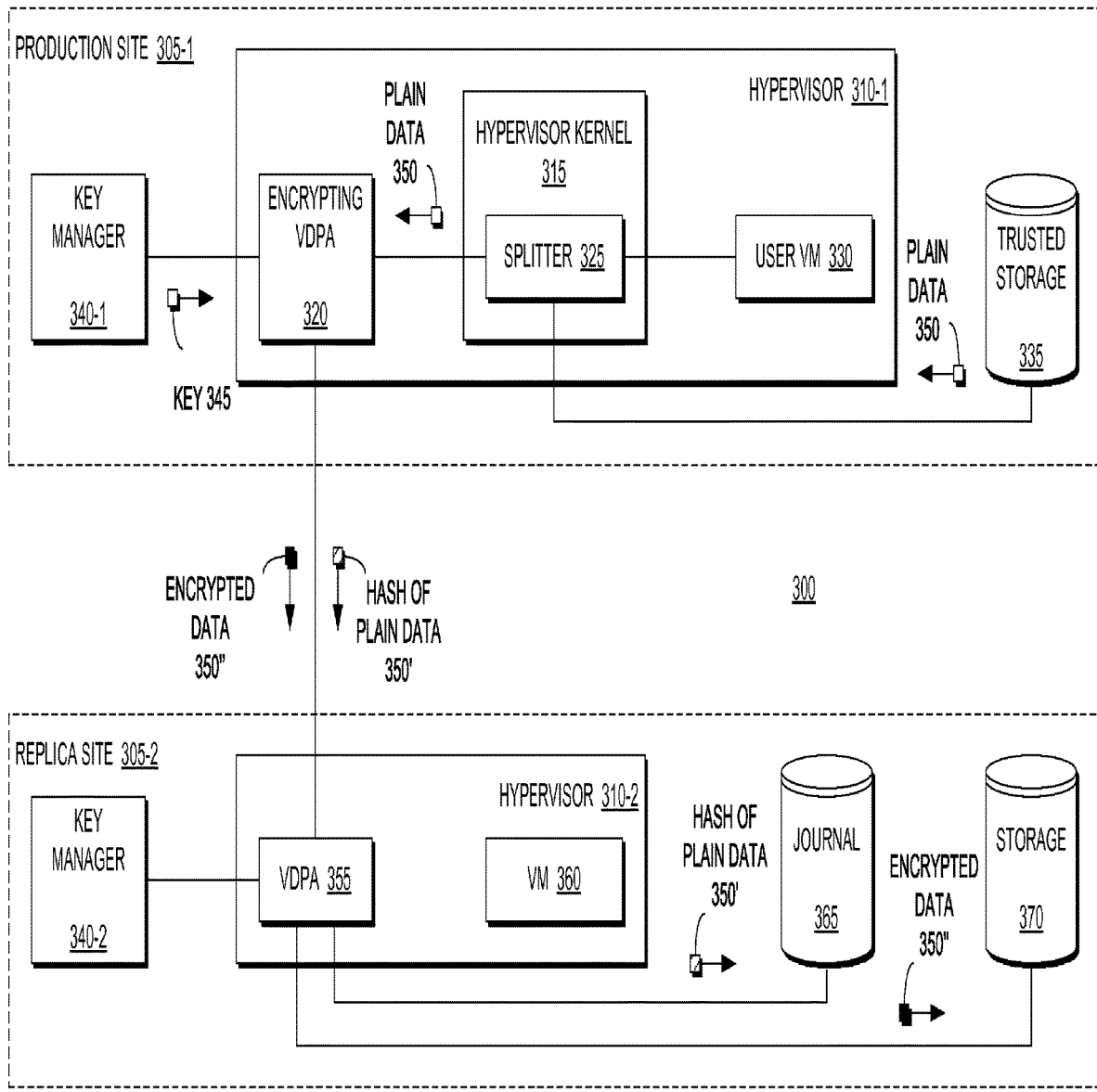
FIG. 3 is a block diagram of a secure data replication system storing data according to an example embodiment of the present invention.
Figure 4:
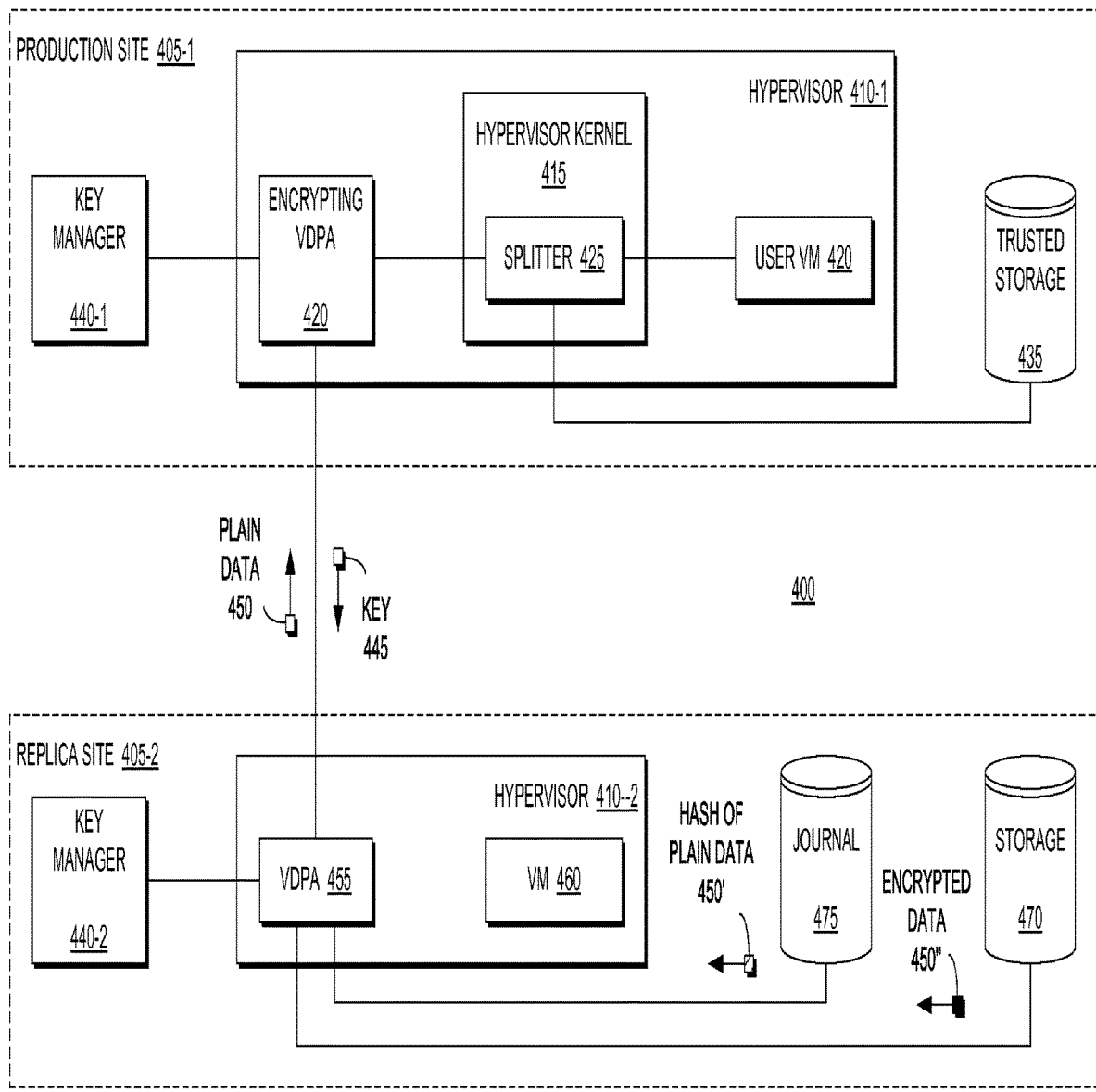
FIG. 4 is a block diagram of a secure data replication system verifying integrity of data according to an example embodiment of the present invention.

FIGS. 3 and 4 are block diagrams of a secure data replication system 300, 400 for storing and verifying integrity of data according to respective example embodiments of the present invention at respective times. FIGS. 5A-5D are flow diagrams illustrating methods for storing and verifying integrity of data according to respective example embodiments of the present invention. FIGS. 3, 4, and 5A-5D may be described in conjunction.

As illustrated in FIGS. 3 and 4, the system 300, 400 includes a production site 305-1, 405-1 and a replica site 305-2, 405-2. The production site 305-1, 405-1 may include a hypervisor 310-1, 410-1 operating a virtual data protection appliance (VDPA) 320, 420, a splitter 325, 425 operating in the hypervisor kernel 315, 415, and one or more user virtual machines (VMs) 330, 430. The production site 305-1, 405-1 also may include trusted storage (e.g., a production volume) 335, 435 for storing user data, and a key manager 340-1, 440-1 for issuing a key 345, 445 to the VDPA 320, 420 for encryption of user data 350. The replica site 305-2, 405-2 also may include a hypervisor 310-2, 410-2 operating a VDPA 355, 455 and one or more VMs 360, 460 and a key manager 340-2, 440-2 for issuing a key (not shown) to the replica site VDPA 355, 455. The replica site 305-2, 405-2 also may include a journal 365, 465 and storage (e.g., a replica volume) 370, 470 for storing encrypted user data.

When production site VM 330 is configured for secured replication, a replica VM 360 is generated at replica site 305-2 with the same configuration of VM 330 on the production site 305-1, and a key 345 is generated for VM 330. The key 345 is generated by a key manager 340-1. The key 345 may be generated with a unique key ID which may be later used for retrieving the key 345 from the key manager 340-1. In certain embodiments, Key IDs may be stored at a replication site journal 365, which may be for persistency, and in the memory of VDPA 355. Key IDs also may be stored at a production site journal (not shown) on trusted storage 335. Key IDs also may be stored on the production site VDPA 320. The encrypting VDPA 320 also may store a volatile copy of the key 345 for encryption.

While the embodiment illustrated in FIGS. 3 and 4 shows a single virtual machine on the production site and the replication site, in certain embodiments, the production site and replication site hypervisors may have multiple virtual machines. In some embodiments, the key manager may likewise store multiple keys corresponding to multiple virtual machines.

It should be understood that, as described in copending U.S. patent application Ser. No. 14/102,043 entitled "ENCRYPTED VIRTUAL MACHINES IN A CLOUD" filed on Dec. 10, 2013, the five step journaling process described above may be performed between the production site 305-1 and the replica site 305-2 for I/O operations being performed at the production site 305-1 and the user data is encrypted, thus not allowing the plain data to arrive to the replica site. The encrypted data 350" may be sent from the production site VDPA 320 to the replica site VDPA 355 to the replica site storage 370. However, in such embodiments, the user cannot know if the image in the cloud was tampered with (i.e., if someone replaced the encrypted data in the replica site 305-2 (e.g., the "cloud") with other data; thus, if the user tries to recover data, the image will be corrupt).

As described above, data protection products, such as EMC RecoverPoint® by EMC Corporation of Hopkinton, Mass. may manage a journal. Example embodiments of the present invention add integrity verifications in the journal for the stream of replicated data arriving at the replica site. As will be described in greater detail below, the system may add periodic hash values for sections of the volume at the production site in the journal. In other words, every period of time the system may add within the journal a hash value of a portion of the production site storage, thus allowing the system to verify the portion is indeed correct (i.e., if the portion was not touched again since the hash value was changed).

In certain embodiments, when a user wants to recover a volume from a point in time, the system will look for hash values in the journal around the relevant point in time and, for each hash value which should not have changed, a checking protocol will run to verify that the encrypted data indeed matches the actual data. In other embodiments, for special points in time, the system may include a full list of all the hashes (e.g., points in time which are daily application consistent backup). Therefore, a user recovering for such points in time will have assurance that the recovered data is identical to the backed up data. In yet other embodiments, the integrity verification may be a random testing that certain blocks did not change, thus giving partial assurance.

As illustrated in FIGS. 3 and 5A, the production site VDPA 320 may read data (e.g., plain, unencrypted data) from the trusted storage production volume 335 at the production site 305-1 (505) and store a representation (e.g., hash) of the plain data 350' at the replica site 305-2 (510). It should be understood that the encrypted user data 350" may be sent at a different time as described above with reference to the five step journaling process. As will be described below, the replica site VDPA 355 then may later verify the integrity of the encrypted data 350" stored in the storage 370 of the replica site 305-2 (550).

As illustrated in FIGS. 3 and 5B, to store the representation of the data 350' at the replica site 305-2 (510), the production site VDPA 320 may generate the representation of the data 350' (i.e., a hash or other similar value) (515) and forward the representation of the data 350' to the replica site 305-2. The replica site VDPA 355 then may receive the representation of the data 350' and store the representation of the data 350' to the journal 365 (540). It should be understood that, in a preferred embodiment, hashes are performed on chunks of data (e.g., 1 MB). In certain embodiments, performing hashes on a per I/O basis during the replication process would be problematic as the data would need to be reread in order to recalculate the hash.

In certain embodiments, as illustrated in FIGS. 3 and 5C, to generate the representation of the data 350' (515), the production site VDPA 320 may read plain (i.e., unencrypted) data 350 from the trusted storage 335 (520) and then generate the representation of the data 350' as a representation of the plain data by performing an operation (e.g., hash) on the plain data (530) to generate the representation of the data 350'. The representation of the data 350' then may be sent from the production site VDPA 320 to the replica site VDPA 355 using the five step journaling process described above, with, in certain embodiments, the representation of the data 350' being written to the journal 365 at the replica site 305-2 (545). It should be understood that, in certain embodiments, the key 345 may be a key that is not sent to the replica site 305-2 except for failover situations.

In certain embodiments, the production site VDPA 320 may generate the representation of the data 350' on a periodic basis or, in other embodiments, based on a volume at the production site 305-2. Example embodiments of the present invention are equally as applicable to CDP (i.e., hashes calculated periodically) and snapshots (i.e., hash calculated for a full snapshot). In other embodiments, when a bookmark is created, a snapshot also may be created on the production site storage 335, with a hash for the snapshot being created and sent to the replica site journal 365. When a user wants to access this point in time, a full hash of the PIT is available for verification.

In other words, example embodiments of the present invention may include an integrity verification engine that runs at the production site 305-1 and periodically reads plain data 350 from the production volume 335 and creates a hash value 350' of the plain data 350. The hash 350' then may be stored in the replica site journal 365 (e.g., periodically, for a chunk of data, or for a point in time). Therefore, if someone has access to the replica site storage 370 (i.e., a vulnerability) but not the replica site VDPA 355 they will not be able to tamper with the data.

As illustrated in FIGS. 4 and 5D, the replica site VDPA 455 may verify the integrity of data stored in a replica volume storage 470 (550), such as prior to allowing access to the replica volume 470. For example, as illustrated in FIG. 5D, if a user requests access to a point in time image at the replica site 405-2, the key 445 for accessing the data may be transferred from the production site 405-1 to the replica site 405-2. The replica site VDPA 455 then may start verifying integrity of the encrypted data 450" at the replica site (555). In a preferred embodiment, the replica site VDPA 455 looks for a hash of a data portion which was not overwritten in the journal 475. The replica site VDPA 455 then may read encrypted data 450" from the replica site storage 470 and decrypt it according to the key 445 transferred from the production site 405-1 to the replica site 405-2. The replica site VDPA 455 then may take a hash of the decrypted data (not shown) and compare it to the hash 450' of the plain data retrieved from the journal 475. If the newly calculated hash (not shown) does not match the hash 450' retrieved from the journal 475, the encrypted data 450" may be marked as tampered with.

Example embodiments of the present invention may perform verification at various points, including during image access mode, during replication, and when accessing a point in time.

In certain embodiments, the replica site VDPA 455 may verify encrypted data integrity when in image access mode. For example, the replica site VDPA 455 may receive a selection of an image at the replica site and examine one or more representations of data (i.e., hashes) stored previously in the journal 475 at the replica site 405-2 for locations in the volume 470 not overwritten since the representation of data was generated. Therefore, when the user VM 460 accesses an image, the VDPA 455 may look for hash values for the portions of data stored previously on the journal for the locations that were not overwritten since the hash value was taken. The VDPA 455 then may verify that the data was not tampered with by calculating the hash value for data 450 in the encrypted storage according to the key 445.

In other embodiments, the replica site VDPA 455 may verify encrypted data integrity while performing replication. In other words, every time the VDPA 455 reads a hash 450' from the journal 475, the VDPA 455 may verify that the hash 450' corresponds to the encrypted data 450" on the replica site storage 470 and that the encrypted data 450" was not tampered with again by reading the encrypted data 450" from the replica site storage 470, decrypting it using the key 445 transferred from the production site 405-1 to the replica site 405-2, and calculating a hash of the decrypted data (not shown) and comparing the newly calculated hash (not shown) to the hash 450' retrieved from the journal 475.

In yet other embodiments, for a specific point in time, the VDPA 455 may receive a selection of a point in time (e.g., from a user) at the replica site 405-2. The VDPA 455 then may examine the journal 475 at the replica site 405-2 prior to the point in time for one or more representations of data (e.g., hashes) 450'.

It should be understood that, in certain embodiments, the VDPA 455 may provide access to the encrypted data 450 according to the verification of the integrity of the data by unencrypting the data according to the private key (e.g., key 345 of FIG. 3).

Figure 6:
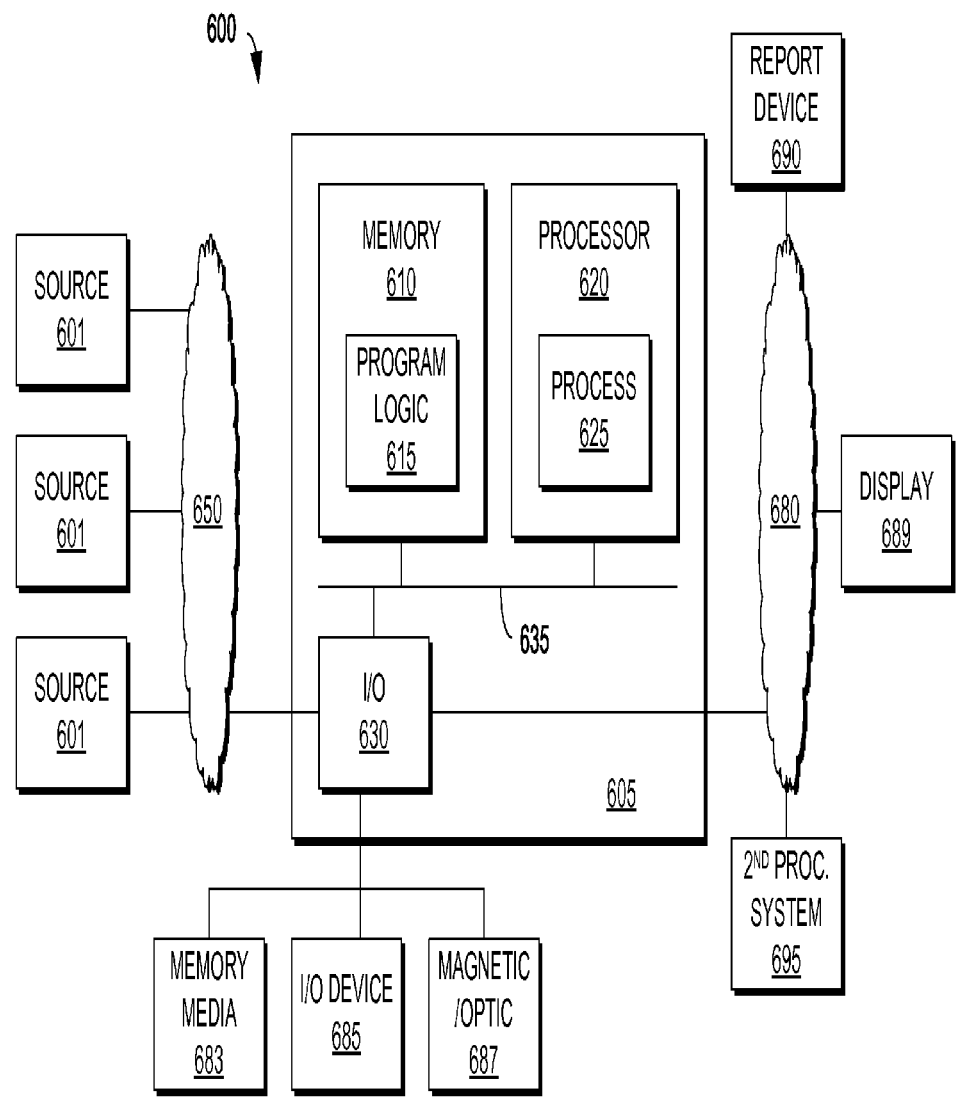
FIG. 6 is a block diagram of an apparatus according to example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
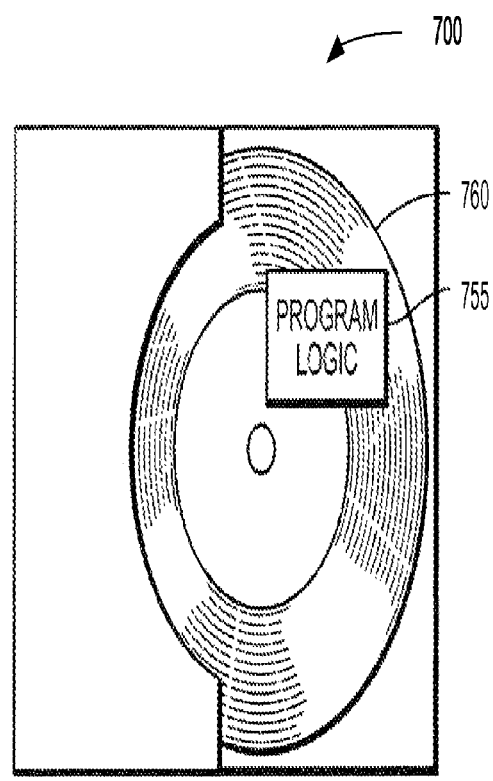
FIG. 7 is an illustration of computer program code according to an example embodiment of the present invention.

FIG. 7 shows program logic 755 embodied on a computer-readable medium 760 as shown, and wherein the logic 755 is encoded in computer-executable code configured for carrying out the methods of this invention, thereby forming a computer program product 700.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system, comprising:
   one or more processors; and
   a non-transitory computer-readable storage medium having computer program code encoded thereon that is executable by the one or more processors to perform operations comprising:
      receiving a hash of production data that resides at a production volume of a production site;
      storing the hash to a replica site journal of a replica site;
      receiving an encrypted copy of the production data;
      storing the encrypted copy of the production data in a replica volume at the replica site; and
      verifying integrity of the encrypted data stored in the replica volume by performing operations, at the replica site, comprising:
         reading out, and decrypting, the encrypted copy of the production data;
         hashing the decrypted production data;
         comparing the hash of the decrypted production data with the hash stored in the replica site journal, and either:
            marking the decrypted production data as compromised when the hash of the decrypted production data does not match the hash stored in the replica site journal; or,
            providing access to the decrypted production data at the replica site when the hash of the decrypted production data matches the hash stored in the replica site journal.

2. The system of claim 1, wherein decrypting the encrypted copy of the production data stored at the replica site is performed using a key that was used to encrypt the data at the production site.

3. The system of claim 1, wherein verifying integrity of the encrypted data stored in the replica volume is performed at one of the following times: when the replica site is in an image access mode; while the replica site is performing replication; or, at a point in time specified by a user.

4. The system of claim 1, wherein the production data comprises a portion of a virtual machine (VM).

5. The system of claim 1, wherein the replica site is a public cloud site.

6. The system of claim 1, wherein the operations further comprise preventing access to the decrypted production data at the replica site when the hash of the decrypted production data does not match the hash stored in the replica site journal.

7. The system of claim 1, wherein the hashed portion of the decrypted production data comprises one or more chunks of data.

8. The system of claim 1, wherein receiving a hash of production data comprises receiving a plurality of hashes, each of which corresponds to a respective portion of the production data.

9. The system of claim 1, wherein the production data comprises a snapshot.

10. The system of claim 1, wherein data integrity verification is performed while replication from the production site to the replica site is ongoing.

* * * * *